United States Patent [19]
Kobayasi

[11] 3,858,551

[45] Jan. 7, 1975

[54] APPARATUS FOR EPITAXIAL GROWTH FROM THE LIQUID STATE

[75] Inventor: Hiroyuki Kobayasi, Osaka, Japan

[73] Assignee: Matsushita Electric Industrial Company, Limited, Osaka, Japan

[22] Filed: Apr. 23, 1974

[21] Appl. No.: 463,406

Related U.S. Application Data

[60] Division of Ser. No. 262,529, June 14, 1972, Pat. No. 3,827,399, which is a continuation of Ser. No. 860,772, Sept. 24, 1969, abandoned.

[52] U.S. Cl. .................... 118/64, 118/426, 266/24

[51] Int. Cl. .................... H01l 7/00

[58] Field of Search .......... 118/425, 426, 423, 30, 118/64; 117/113, 114 A, 114 B, 114 C, 114 R; 148/171, 172; 266/24

[56] References Cited

UNITED STATES PATENTS

| | | | |
|---|---|---|---|
| 411,504 | 9/1889 | Klauder | 118/426 X |
| 1,537,117 | 5/1925 | Hurd | 118/426 X |
| 2,025,467 | 12/1935 | Lovell et al. | 118/425 X |
| 2,157,875 | 5/1939 | Weiskopf | 118/425 X |
| 2,701,546 | 2/1955 | Townsend | 118/426 |
| 3,435,835 | 4/1969 | Hobbs | 118/426 UX |
| 3,551,219 | 12/1970 | Panish et al. | 118/425 X |
| 3,606,986 | 9/1971 | Greenberg | 266/24 X |

*Primary Examiner*—Morris Kaplan
*Attorney, Agent, or Firm*—Depaoli & O'Brien

[57] ABSTRACT

An apparatus adapted for epitaxial growth from the liquid state. This apparatus has a furnace tube within which a substrate wafer to be processed and a solution containing a material to be epitaxially grown on the substrate wafer are isolated in cross section from each other before the epitaxial growth. With this arrangement, the constant-temperature zone necessary for the uniform heating of the substrate wafer and the solution can be shortened compared to conventional apparatus.

1 Claim, 11 Drawing Figures

APPARATUS FOR EPITAXIAL GROWTH FROM THE LIQUID STATE

This is a division, of application Ser. No. 262,529 filed June 14, 1972 now U.S. Pat. No. 3,827,399, which is a continuation of Ser. No. 860,772, filed Sept. 24, 1969, now abandoned.

This invention relates to improved apparatus for epitaxial growth from the liquid state.

It is an object of this invention to provide an apparatus used for liquid-phase epitaxy which apparatus is simple in construction.

It is another object of this invention to provide an apparatus adapted for the purpose and having a shorter constant-temperature zone than in such apparatus as has been available heretofore.

It is another object of this invention to provide an apparatus which is capable of multi-layer epitaxial growth.

These and other objects will be effected by this invention as will be apparent from the following description taken in accordance with the accompanying drawings, in which.

Figure 1:
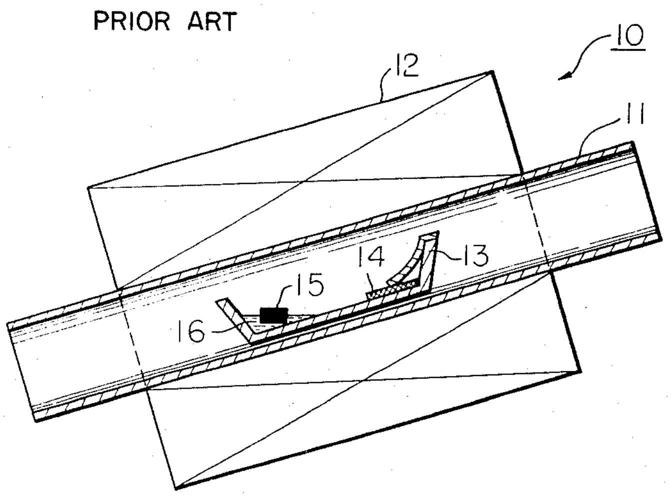
FIG. 1 is a longitudinal section of a conventional apparatus for epitaxial growth from the liquid state.

FIG. 1 shows a conventional apparatus 10 used for liquid-phase epitaxy. The apparatus as shown comprises, largely, a furnace tube 11 made of, for example, quartz, a heating coil 12 surrounding the furnace tube 11, and a boat 13 provided internally of the furnace tube 11 and made of, for example, graphite, glassy carbon or quartz. In the diagram, the starting condition for the epitaxial growth from the liquid state is illustrated. As illustrated, the apparatus 10 is tipped and a substrate wafer 14 to be processed is held tightly against the upper end of the flat bottom of the boat 13. At the lower end of the boat is placed a mixture of a material 15 to be epitaxially grown on the substrate wafer 14 and a solvent 16 therefor. The boat 13 is held in position substantially at the middle portion of a constant-temperature zone of the furnace tube 11, which zone results from the heating coil 12. With the furnace tube 11 tipped as shown and with a flow of alternate gas through the tube 11, the boat 13 is heated to a predetermined temperature. As the temperature rises, the material 15 disssolves in the solvent 16 at the lower end of the boat 13. When the temperature reaches the predetermined temperature, the solvent 16 is saturated with the material 15. At this time, the furnace tube 11 is tipped so that the molten material covers the exposed surface of the substrate wafer 14, and the heating power is turned off. As the furnace cools down, precipitation of the material from the solution and epitaxial growth upon the substrate 14 occur.

The apparatus 10 of this known type, however, has the disadvantages that it requires not only a complicated mechanism for swinging the furnace about an axis perpendicular to the tube axis but also a long furnace for forming a relatively long constant-temperature zone. Furthermore, it is difficult to maintain the zone at desired temperatures before and after the swinging operations.

Figure 2:
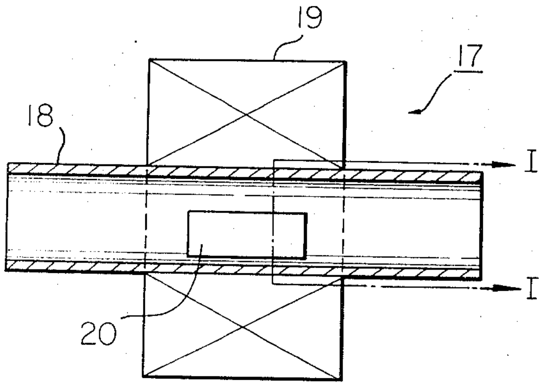
FIG. 2 is a view similar to FIG. 1, showing an apparatus for epitaxial growth from the liquid state constructed in accordance with a first embodiment of this invention.
Figure 3:
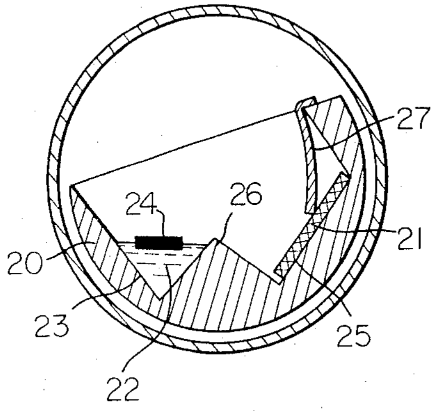
FIG. 3 is a cross section on the line I—I of FIG. 2.

Such difficulties are eliminated in the apparatus for epitaxial growth from the liquid state of this invention. Referring to FIG. 2, a longitudinal section of the present apparatus 17 according to a first embodiment of this invention is shown. The apparatus 17 comprises, as customary, a furnace tube 18, a heating coil 19 surrounding the furnace tube 18 and a boat 20 provided internally of the tube 18. The boat 20 used in this embodiment is, as shown in FIG. 3, different in construction from that of FIG. 1 in that before the epitaxial growth a substrate wafer 21 is isolated from a solution 22 in cross section, not axially. The boat 20 is generally semi-cylindrical, having a first axially extending sunk portion 23 for storing the solution 22 containing a material 24 to be epitaxially grown on the substrate wafer 21, a second axially extending sunk portion 25 for holding the substrate wafer 21 and an axially extending raised portion 26 isolating in cross section the first sunk portion 22 from the second 25. Similarly to FIG. 1, the substrate wafer 21 is fixed tightly against the bottom of the second sunk portion 25 by means of a clamping member 27.

In operation, the boat 20 is rotated clockwise about its axis so that the solution 22 stored in the first sunk portion 23 flows into the second sunk portion 25 and covers the exposed surface of the substrated wafer 21. With this arrangement, the constant-temperature zone necessary for the uniform heating of the substrate wafer 21 and the solution 22 is shorter than that of the conventional apparatus in which the substrate wafer is isolated from the solution in the axial direction. Furthermore, an increased efficiency of processing is achieved with a limited length of the constant-temperature zone, because a number of substrate wafers can be juxtaposed along the length of the zone. Still furthermore, this arrangement is simpler in construction than the conventional one because it is unnecessary to have the entire furnace tipped about the axis perpendicular to the tube axis.

Figure 4:
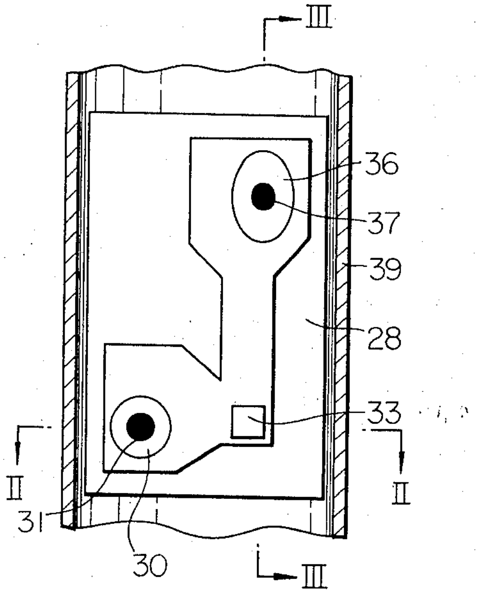
FIG. 4 is a partially cut away top plan view showing a second embodiment of this invention.
Figure 5:
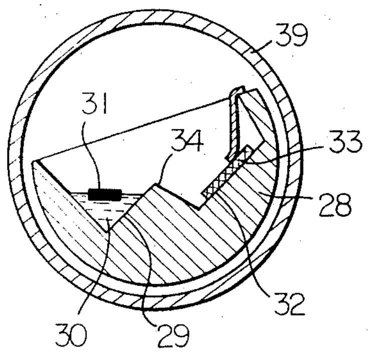
FIG. 5 is a view similar to FIG. 3, showing the apparatus of FIG. 4 as taken along the line II—II of FIG. 4.
Figure 6:
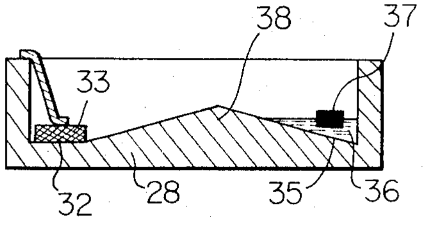
FIG. 6 is a longitudinal section as taken along the line III—III of FIG. 4.

FIGS. 4, 5 and 6 show a second embodiment of this invention which is capable of multi-layer epitaxial growth. As best seen in FIGS. 4 and 5, the boat 28 as used is similar in construction to the boat 20 of FIG. 3 in that it has a first sunk portion 29 for storing a first solution 30 containing a first material 31 to be epitaxially grown, a second sunk portion 32 for holding a substrate wafer 33 and a first raised portion 34 isolating in cross section the first sunk portion 29 from the second 32. In addition to these portions 29, 32, 34, the boat 28 is provided with a third sunk portion 35 for storing a second solution 36 containing a second material 37 to be epitaxially grown on the substrate wafer 33 and a second raised portion 38 isolating axially the second sunk portion 32 from the third 35, as is clearly shown in FIG. 6.

In operation, the boat 28 is first rotated clockwise about the axis of the furnace tube 39 while kept in its axially horizontal position so that the first solution 30 flows into the exposed surface of the substrate wafer 33 to cause a first epitaxial layer to be formed on the substrate wafer 33. The boat 28 is then rotated counterclockwise about the tube axis until it resumes its original position shown in FIG. 5. The furnace tube 39 is thereafter tipped about an axis perpendicular to the tube axis counterclockwise as seen in FIG. 6, so that the second solution 36 stored in the third sunk portion 35 flows into the second sunk portion 32 to cover the surface of the substrate wafer 33. Thus, a second epitaxial layer is formed on the first epitaxial layer previously formed on the substrate wafer 33.

With the arrangement as proposed, it is possible to have a plurality of epitaxial layers formed on a substrate wafer.

Figure 7:
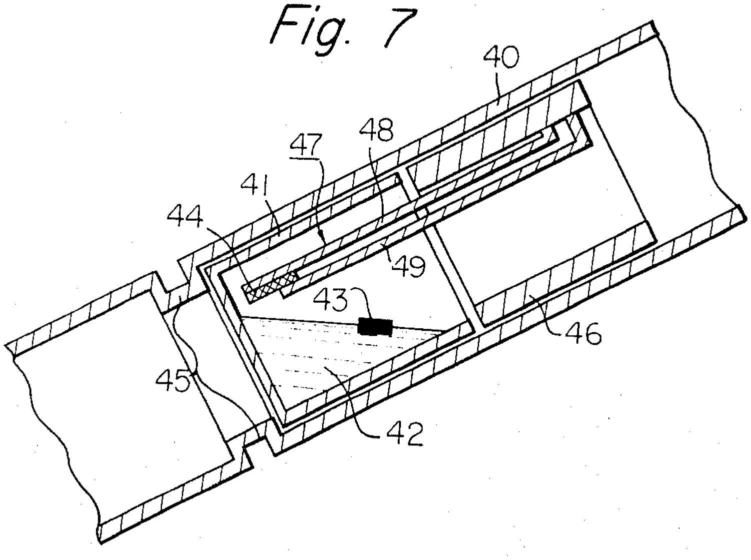
FIGS. 7 and 8 are longitudinal sections of a third embodiment of this invention in different relative positions.
Figure 8:
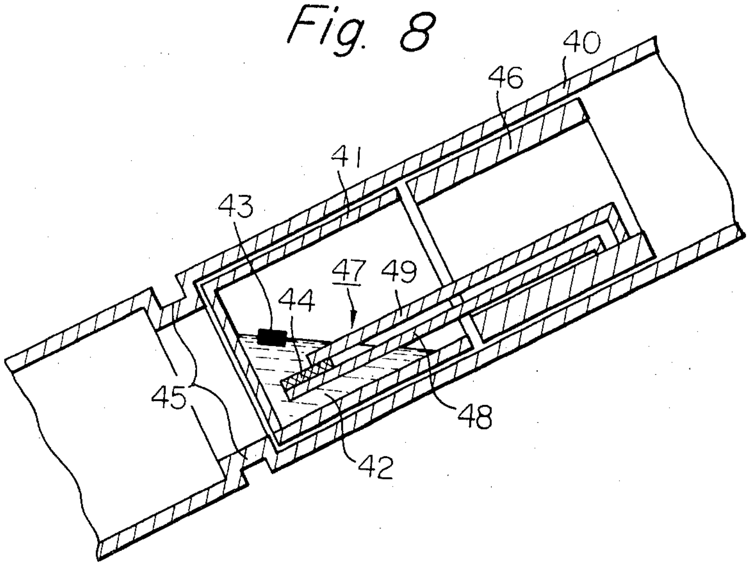

FIGS. 7 and 8 show a third embodiment of this invention. As shown, the furnace tube 40 is kept tipped during the operation. Internally of the furnace tube 40 is provided a cylindrical crucible 41 for storing a solution 42 containing a material 43 to be epitaxially grown on a substrate wafer 44. To prevent the crucible 41 from slipping down through the tube 40, a constriction 45 is provided in the furnace tube 40. Adjacent the end of the crucible 41 opposite to the constriction 45 is provided a cylindrical member 46 for supporting the substrate 44. The substrate 44 is suspended above the solution 42 by a suitable means 47. The means 47 comprises a first plate member 48 made of the same material as that of the cylindrical crucible 41, for example, ceramics, and a second plate member 49 for clamping the substrate wafer 44 onto the first plate member 48. The second plate member 49 may also be made of the same material as that of the cylindrical crucible 41. The first and second plate members 48, 49 are attached at their one ends to the cylindrical member 46 by suitable adhesives. However, where these plate members 48, 49 are made of such material as cannot be adhered to the cylindrical member 46, they may be attached to supporting members (not shown) which are anchored to the cylindrical member 46.

In operation, the substrate wafer 44 suspended above the solution 42 by the clamping means 47 is immersed in the solution 42 by swinging the cylindrical member 46 about its axis, as is clearly shown in FIG. 8. By so doing, an epitaxial film is grown on the substrate wafer 44. With the arrangement as proposed, the required constant-temperature zone is significantly shortened, providing simplicity of the entire construction. Furthermore, the substrate wafer 44 which is supported not by the crucible 41 but by the cylindrical member 46 is easily accessible from outside furnace tube 40.

Figure 9:
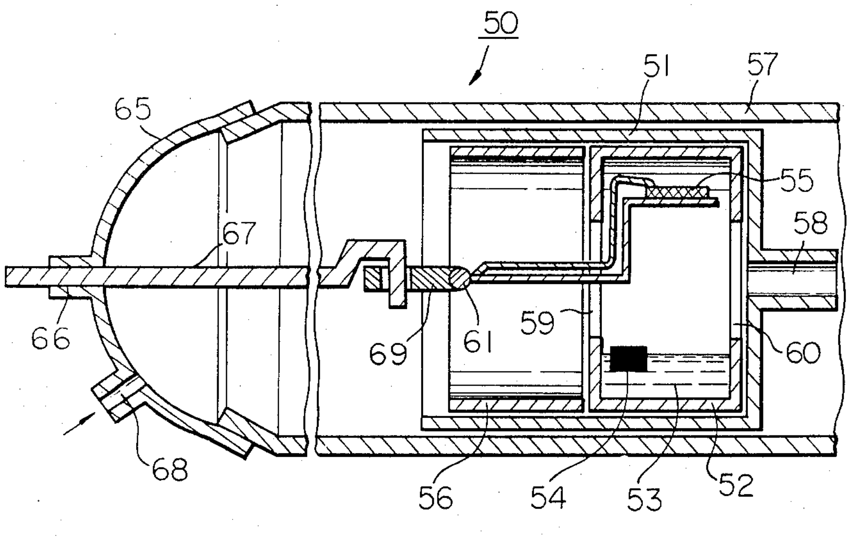
FIG. 9 is a longitudinal section of an apparatus according to a fourth embodiment of this invention.
Figure 10:
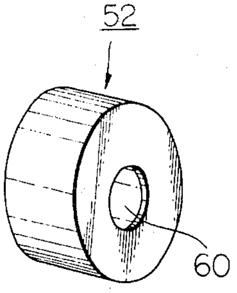
FIG. 10 shows schematically a cylindrical crucible incorporated in the apparatus of FIG. 9.

FIG. 9 shows another embodiment of this invention which is similar to that of FIG. 7 in that the container (which actually is an alternative of the boat used in the preceding embodiments) for the solution and the member for supporting the substrate wafer are structurally isolated from each other. The apparatus 50 as shown, largely, comprises a generally cylindrical casing 51, a cylindrical crucible 52 for storing a solution 53 containing a material 54 to be epitaxially grown on the substrate wafer 55, said crucible 52 being provided internally of the casing 51, a cylindrical member 56 for supporting the substrate 55, said cylindrical member 56 being also provided internally of the casing 51 and a furnace tube 57 having a heating coil (not shown) provided therearound and having the casing 51 accommodated therein. The casing 51 is provided at one end with a small port 58 for substituting a gas. The cylindrical crucible 52 is, as is clearly shown in FIG. 10, of a cylindrical configuration having a small circular port 59, 60 formed centrally in each side wall thereof. The outside diameter of this cylindrical crucible 52 is slightly smaller than the inside diameter of the casing 51. The cylindrical member 56 has an outside diameter equal to that of the cylindrical crucible 52.

Figure 11:
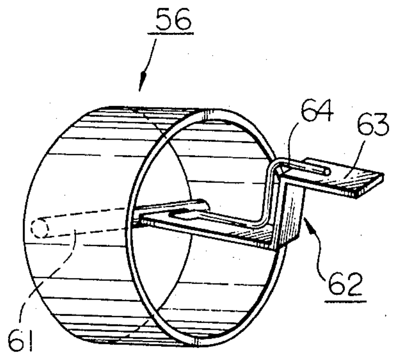
FIG. 11 shows schematically a cylindrical member for supporting the substrate wafer, which is incorporated in the apparatus of FIG. 9.

As is clearly shown in FIG. 11, a supporting member 61 is provided diametrically of the cylindrical member 56 for carrying clamping means 62. The clamping means 62 comprises a stepped plate-like member 63 and a spring member 64 attached thereto and serves to clamp the substrate wafer 55 and suspend it in the cylindrical crucible 52 above the solution 53 off the axis thereof.

A cap member 65 having two openings is provided in the furnace tube 57. One of the openings 66, which is positioned in alignment with the tube axis, hermetically receives a shaft 67 for rotating the cylindrical member 56. The other of the openings 68 is provided for feeding alternate gas into the furnace tube 57. The shaft 67 is linked to a joint 69 which is secured to the supporting member 61 diametrically mounted on the cylindrical member 56. Thus, when the cylindrical member 56 is rotated about its axis in the casing 51 by rotating the shaft 67, the substrate wafer 55 secured to the clamping means 62 is immersed in the solution 53 stored in the cylindrical crucible 52.

It is to be noted that the components of the apparatus should be made of such materials as having a stability in high temperature conditions. These materials include quartz, graphite and glassy carbon. It will now be appreciated that, with the arrangements as herein described and shown, the constant-temperature zone necessary for uniformly heating the substrate wafer and the solution can be shortened compared with that of the conventional apparatus.

What is claimed is:

1. Apparatus for epitaxial growth of a film on a substrate from the liquid state comprising:

a horizontally disposed cylindrical furnace tube;

a heating coil surrounding a portion of said tube;

a cylindrical crucible, coaxial with and disposed within said surrounded portion of the tube, having an aperture in each end wall thereof, and containing a pool of said liquid; and a rotatable substrate support axially extending through one of said apertures and including substrate clamping means at the inserted end thereof and spaced from the support axis whereby to support said substrate above said pool and whereby upon rotation of said support said substrate orbits about said support axis to sequentially immerse the substrate in said pool to effect said growth and to withdraw said substrate.

* * * * *